June 3, 1952  E. J. FISCHER  2,598,775
ELECTRIC TEST DEVICE
Filed May 11, 1951
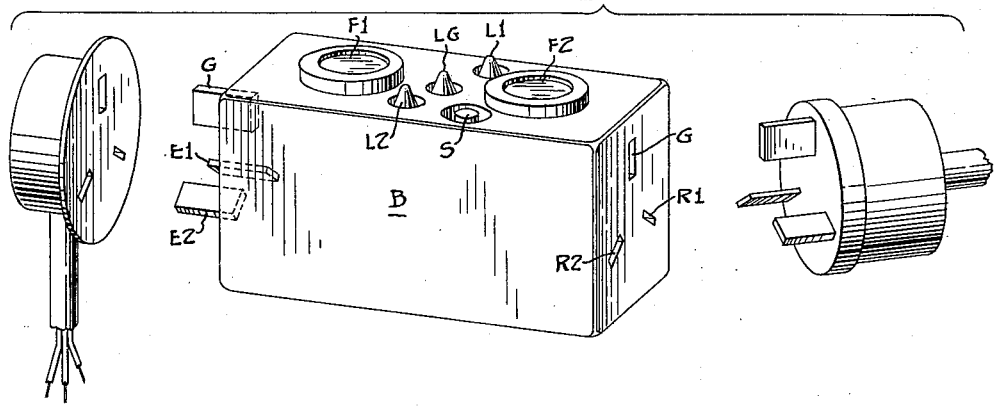
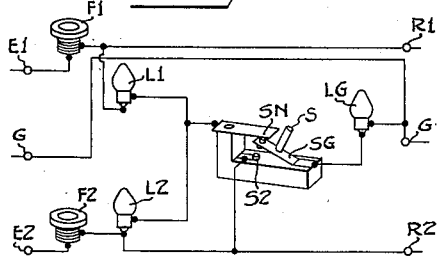
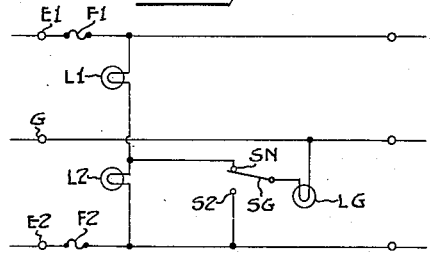
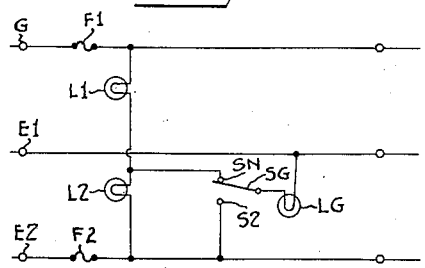
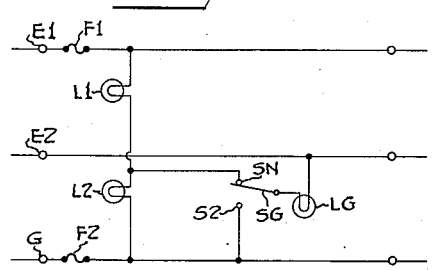
INVENTOR
EDWARD J. FISCHER
BY
AGENT

UNITED STATES PATENT OFFICE 2,598,775

ELECTRIC TEST DEVICE

Edward J. Fischer, Vancouver, Wash.

Application May 11, 1951, Serial No. 225,734

2 Claims. (Cl. 175—183)

My invention relates to devices for testing electric circuits and has particular application to testing the circuit connections to three wire single phase polarized receptacles of the type commonly provided in house wiring for connecting the attaching plug of an electric range.

It is a primary object of my invention to assure the range installer that the range receptacle is properly connected to the house wiring so that the range elements will not be damaged when its attachment plug is plugged into the receptacle.

It is a second object of my invention to indicate to the installer just how the receptacle is mis-connected in case the receptacle is not connected properly to the house service.

It is a third object of my invention to insert a fuse in each of the ungrounded wires of the range service circuit so that in case the range or any of its parts are not properly connected no damage will be done and the trouble can be quickly found and the connection restored without having to hunt up the main supply box to replace a fuse.

It is a fourth object of my invention to provide such a device which is low in first cost, rugged in construction, of relatively small size, having a form making it convenient to use, and particularly adapted to the testing of the common type of single phase three wire circuit having one of the wires at ground potential and with the other wires at potentials of equal instantaneous magnitudes but of opposite instantaneous polarities.

How these and other objects are attained in the device of my invention is made clear in the following description referring to the attached drawing in which Fig. 1 is a perspective view of one form of my device between a range service receptacle and a range cord plug with which it is used.

Fig. 2 is a diagram showing the circuit relations of the active elements of the device of Fig. 1.

Fig. 3 is a simplified schematic diagram of the device of Figs. 1 and 2, showing the electric potentials applied to the elements of the device when the device is plugged into the house circuit receptacle and the receptacle is properly wired in the house circuit.

Fig. 4 is the same as Fig. 3 but with the house circuit mis-connected to the receptacle so that the ground wire is interchanged with one of the energized wires.

Fig. 5 is the same as Fig. 4 but with the house circuit mis-connected to the receptacle so that the ground wire is interchanged with the other of the energized wires.

Referring now to the drawings, in Fig. 1 is shown, without the simple and well-known details of construction and wired in accordance with Fig. 2, an insulating body B having inset conducting receptacle elements R1, R2, and G, in one end and conducting plug prongs E1, E2, and G, extending from the other end. A receptacle for plug fuse F1 is wired between prong receptacle R1 and prong E1. A receptacle for plug fuse F2 is wired between prong receptacle R2 and prong E2. Prong G is wired to prong receptacle G.

A single pole double throw switch having a conducting blade SG biased to normally contact with terminal SN but operable by pressure applied to insulating switch stem S to leave terminal SN and make contact with terminal S2, is mounted within insulating body B in such a manner that stem S is exposed for manual manipulation in the recess shown in the top of body B.

A receptacle for indicating lamp L1 is wired between prong receptacle R1 and terminal SN. A receptacle for indicating lamp L2 is wired between prong receptacle R2 and terminal SN. A receptacle for indicating lamp LG is wired between prong G and blade SG. Prong receptacle R2 is wired to terminal S2.

Lamps L1 and LG are selected for operation at the normal effective potential between either of the prongs E1, E2, and the prong G.

In use the device is pushed in place with the prongs E1, E2, and G entered in the mating receptacle of the house circuit, it being understood that both the plug and receptacle ends of my device as well as the house circuit receptacle and the range plug to be connected thereto are polarized by the relative positioning of the prongs of the plugs and the prong receptacles of the plug receptacles so that the plugs can enter the receptacles in only one arrangement of contacts.

With my device thus in test position the elements of the device are subjected to the potentials of the house circuit as shown in Figs. 2 and 3 if the house receptacle is correctly wired or as in Figs. 3 or 4 if the house receptacle is incorrectly wired. Referring to Figs. 2 and 3, if the house receptacle is correctly wired, lamps L1 and L2 in series will be subjected to the potential across prongs E1 and E2 which will be the sum of the potentials across E1, G and E2, G, or twice the potential across either E1 or E2 and G. Since all of the lamps are alike and designed to operate on the potential across E1 or E2 and G, both lamps L1 and L2 will come up to full brightness. As seen, lamp LG will be at ground potential on either side and will not light up. Then to be sure that lamp LG is not defective, lamp LG is tested by depressing switch stem S causing blade SG to leave terminal SN and contact with terminal S2. Now lamp LG is subjected to the potential across E2 and G and comes to full brightness indicating that a true indication was previously given and the house receptacle was wired correctly.

However, if the house receptacle was not correctly wired so that, when my device is plugged in, the potential arrangement is as shown in Fig. 4 as though prongs E1 and G had been interchanged, the potential across lamps L2 and LG in series will be the full line to line potential and lamps L2 and LG will come up to full brightness, while lamp L1, having ground potential at both terminals, will remain dark. If it is desired in this case to test the operability of lamp L1, stem S is depressed only enough to break the contact of blade SG with terminal SN at which time lamp LG will go dark and lamp L1 and L2 will light equally but dimly since each will be subjected to only half of its normal potential.

Similarly if, as indicated in Fig. 5, the house receptacle has been miss-connected by having the ground wire connected to the receptacle so that it would make connection in the normal E2 position, lamp L1 and LG would show equally at full brightness and L2 would remain dark.

It is, therefore, seen that my device is thoroughly effective in locating the position of the ground wire in the wiring to the house receptacle and if the ground wire of the house circuit is connected to other than the ground terminal of the house circuit receptacle the wiring change to be made to correct the difficulty is plainly indicated.

When it is determined that the house circuit receptacle is correctly wired, then the range plug is inserted into the receptacle end of my device, after which the various circuits of the range are individually turned on and off to be sure of their correct operation. Should the wiring of the range be defective in such a way as to throw an excessive load on the line, one of the fuses F1 or F2 of my device will blow to isolate the circuit so that it can be examined and the difficulty corrected. After this the low cost fuse in my device may be replaced and the range testing resumed.

Having thus completely described one form of the device of my invention and clearly explained its use, I claim:

1. In the common type of three wire service connections to an electric range, or the like, wherein the electric service is of the three wire grounded neutral type having the neutrally designated wire at ground potential and and each of the other wires at other than ground potential and wherein the potential between said other wires is equal to the sum of the individual potentials between each of them and ground, the combination of a polarized three prong plug and mating three prong plug receptacle adapted to form a connector in said connection, together with a testing device adapted to be inserted in said service connection between said plug and said receptacle, said testing device comprising an insulating body, three conducting plug prongs secured to and extending from said body and adapted to mate with said receptacle, three conducting plug prong receptacles inset in said body and adapted to mate with said plug, a pair of fuse receptacles inset in said body, three lamp receptacles inset in said body, a single pole double throw switch secured to said body, a first circuit means connecting the neutrally designated one of said three prongs to the neutrally designated one of said three prong receptacles and one terminal the first of said three lamp receptacles, a second circuit means connecting a second one of said three prongs to a second one of said three prong receptacles through a fuse in one of said fuse receptacles and to one terminal of a second of said three lamp receptacles, a third circuit means connecting the third one of said three prongs to the third one of said three prong receptacles through a fuse in the other of said fuse receptacles, to one terminal of the third of said three lamp receptacles and to one point of said switch, a fourth circuit means connecting the blade of said switch to the other terminal of said first lamp receptacle, and a fifth circuit means connecting the other point of said switch to the other terminals of both said second and third lamp receptacles.

2. For insertion between the polarized plug and receptacle making connection between a three wire grounded neutral electric source and an electric load adapted to be served thereby, a test device comprising means for connecting the neutral one of said three wires through said device, means for connecting a separate fuse in each of the other two of said three wires, means for connecting a pair of electric lamps in series between said other two wires, means for connecting the common terminal of a single pole double throw switch to said neutral wire through a third electric lamp, means for connecting one throw terminal of said switch to one of said other wires, and means for connecting the other throw terminal of said switch to the connection between said pair of lamps.

EDWARD J. FISCHER.

REFERENCES CITED

The following references are of record in the file of this patent:

UNITED STATES PATENTS

| Number | Name | Date |
| --- | --- | --- |
| 2,186,212 | Scoggin | Jan. 9, 1940 |
| 2,513,583 | Nicholson | July 4, 1950 |
| 2,548,991 | McNabb | Apr. 17, 1951 |